United States Patent
Knapp et al.

[11] Patent Number: 5,883,996
[45] Date of Patent: Mar. 16, 1999

[54] ELECTRONIC COMPONENT FOR ALIGNING A LIGHT TRANSMITTING STRUCTURE

[75] Inventors: James H. Knapp, Chandler; Francis J. Carney, Gilbert; Laura J. Norton, Apache Junction, all of Ariz.

[73] Assignee: Motorola, Inc., Schaumburg, Ill.

[21] Appl. No.: 886,980

[22] Filed: Jul. 2, 1997

Related U.S. Application Data

[63] Continuation of Ser. No. 536,601, Sep. 29, 1995, abandoned.

[51] Int. Cl.$^6$ ..................................................... G02B 6/36
[52] U.S. Cl. .................................. 385/88; 385/90; 385/92
[58] Field of Search .............................. 385/49, 50, 88, 385/89, 90, 91, 92; 372/6

[56] References Cited

U.S. PATENT DOCUMENTS

| | | | |
|---|---|---|---|
| 4,019,805 | 4/1977 | Marcatili et al. | 350/96 C |
| 4,216,486 | 8/1980 | Geddes | 357/19 |
| 4,533,209 | 8/1985 | Segerson et al. | 350/96.2 |
| 4,750,799 | 6/1988 | Kawachi et al. | 385/50 |
| 4,790,620 | 12/1988 | Niwayama | 350/96.2 |
| 4,916,497 | 4/1990 | Gaul et al. | 357/19 |
| 4,950,044 | 8/1990 | Makita | 385/50 |
| 4,989,051 | 1/1991 | Whitehead et al. | 357/19 |
| 5,218,663 | 6/1993 | Isono et al. | 385/129 |
| 5,247,597 | 9/1993 | Blacha et al. | 385/88 |
| 5,271,083 | 12/1993 | Lebby et al. | 385/130 |
| 5,276,754 | 1/1994 | Blair et al. | 385/88 |
| 5,351,257 | 9/1994 | Lebby et al. | 372/46 |
| 5,394,490 | 2/1995 | Kato et al. | 385/14 |
| 5,434,939 | 7/1995 | Matsuda | 385/88 |

OTHER PUBLICATIONS

Components, Hybrids & Manufacturing Technology Society IEEE; 45th Electronic Components & Technology Conference 1995; IEEE Catalog No. 95CH3582–0; Schwartz et al., Shun Meen Kuo, Stephen G. Shook, and Brian Webb; "A Low Cost, High Performance Optical Interconnect"; pp. 376–379. No month.

*Primary Examiner*—John D. Lee
*Assistant Examiner*—Ellen E. Kang
*Attorney, Agent, or Firm*—George C. Chen

[57] ABSTRACT

An electronic component (10) for aligning a light transmitting structure (19) such as an optical fiber or a waveguide, includes a semiconductor substrate (11) which contains or supports at least one semiconductor device (12). To provide electrical isolation and mechanical protection for the semiconductor device (12), a passivation layer (25) is disposed over the semiconductor substrate (11). At least one alignment feature (14) for the light transmitting structure (19) is provided over the passivation layer (25) and over the semiconductor device (12). The alignment feature (14) is manufactured simultaneously during a flip chip bump process which eliminates the necessity for extra processing steps while providing additional alignment functionality.

13 Claims, 3 Drawing Sheets

ELECTRONIC COMPONENT FOR ALIGNING A LIGHT TRANSMITTING STRUCTURE

This application is a continuation of prior application Ser. No. 08/536.601, filed Sep. 29, 1995 (abandoned).

BACKGROUND OF THE INVENTION

This invention relates, in general, to electronic and optical components, and more particularly, to an electronic component for aligning a light transmitting structure.

Light transmitting structures such as optical fibers and waveguides, are used to enhance high speed communications from chip to chip, from board to chip, from board to board, and even from computer to computer. Optical devices such as, for example, vertical cavity surface emitting lasers (VCSELs) can generate optical signals which are transmitted by light transmitting structures. To ensure adequate light transfer efficiency, the coupling of optical devices and light transmitting structures requires precise alignment to one another. Existing structures and methods for accomplishing this precise alignment are expensive, unmanufacturable, or produce unnecessarily large components due to the inefficient usage of available space.

However, the precision alignment is preferably neither costly nor difficult to accomplish. Moreover, with the continuing efforts of device integration to produce smaller and more compact systems, the actual or physical alignment mechanisms of optical devices, waveguides, and optical fibers should be smaller and more compact as well.

Accordingly, a need exists for an electronic component for aligning a light transmitting structure which is simple to use, manufacturable, and is cost efficient.

SUMMARY OF THE INVENTION

The present invention provides, among other things, an electronic component for aligning a light transmitting structure. The electronic component includes, among other features, a semiconductor substrate having at least one semiconductor device, electrodes coupled to the at least one semiconductor device, and an alignment feature overlying the semiconductor substrate wherein the light transmitting structure is electrically and optically coupled to the at least one semiconductor device and wherein the light transmitting structure is aligned to the at least one semiconductor device by the alignment feature.

The electronic component can also include, among other features, a semiconductor substrate having a surface, a semiconductor device supported by the semiconductor substrate, a first alignment feature over the surface, and a second alignment feature over the surface and substantially parallel to the first alignment feature wherein the light transmitting structure is over the surface and is aligned by the first and second electrodes and wherein the light transmitting structure is capable of transmitting light in a direction substantially parallel to the surface.

The present invention also provides, among other things, an electronic component for aligning an optical fiber having an end. The electronic component includes, among other features, a semiconductor substrate, a light emitting device supported by the semiconductor substrate wherein the light emitting device radiates light from a portion of the light emitting device, and a metal alignment feature over the light emitting device wherein the metal alignment feature has an opening aligned to the portion of the light emitting device and wherein the opening has at least two diameters and wherein the metal alignment feature is devoid of electrical contact with the light emitting device and wherein the end of the optical fiber is positioned in the opening of the metal alignment feature to permit transmission of the light from the portion of the light emitting device and wherein the optical fiber is offset from the semiconductor substrate.

DETAILED DESCRIPTION OF THE DRAWINGS

An electronic component for aligning a light transmitting structure such as, for example, an optical fiber or a waveguide, uses a semiconductor substrate which contains or supports at least one semiconductor device. To provide electrical isolation and mechanical protection for the semiconductor device or devices within the semiconductor substrate, a passivation layer can be disposed over the semiconductor substrate. At least one alignment feature for precisely positioning the light transmitting structure is provided over the passivation layer. In this general embodiment of the present invention, the final size of the electronic device is reduced compared to the prior art because prior art semiconductor substrates used for aligning an optical fibers do not contain or support electronic or optical semiconductor devices.

In a specific embodiment of the present invention, the semiconductor device in the semiconductor substrate is an optical device which generates a light or optical signal, and the alignment feature is a collet which is positioned over the light emitting portion of the optical device. The collet is used to inexpensively, yet precisely, align an optical fiber to the optical device.

An alternative embodiment uses at least two substantially parallel structures for the alignment feature. An optical fiber is positioned between the two substantially parallel structures which automatically align the optical fiber. In this embodiment, it is not required for the optical fiber to be connected directly to the semiconductor devices of the underlying semiconductor substrate.

Another embodiment of the present invention enables the coupling of an optical device and a waveguide without requiring expensive alignment equipment or tools. In this embodiment, the alignment features can be manufactured simultaneously with and made of similar materials as conventional flip chip bumps.

Figure 1:
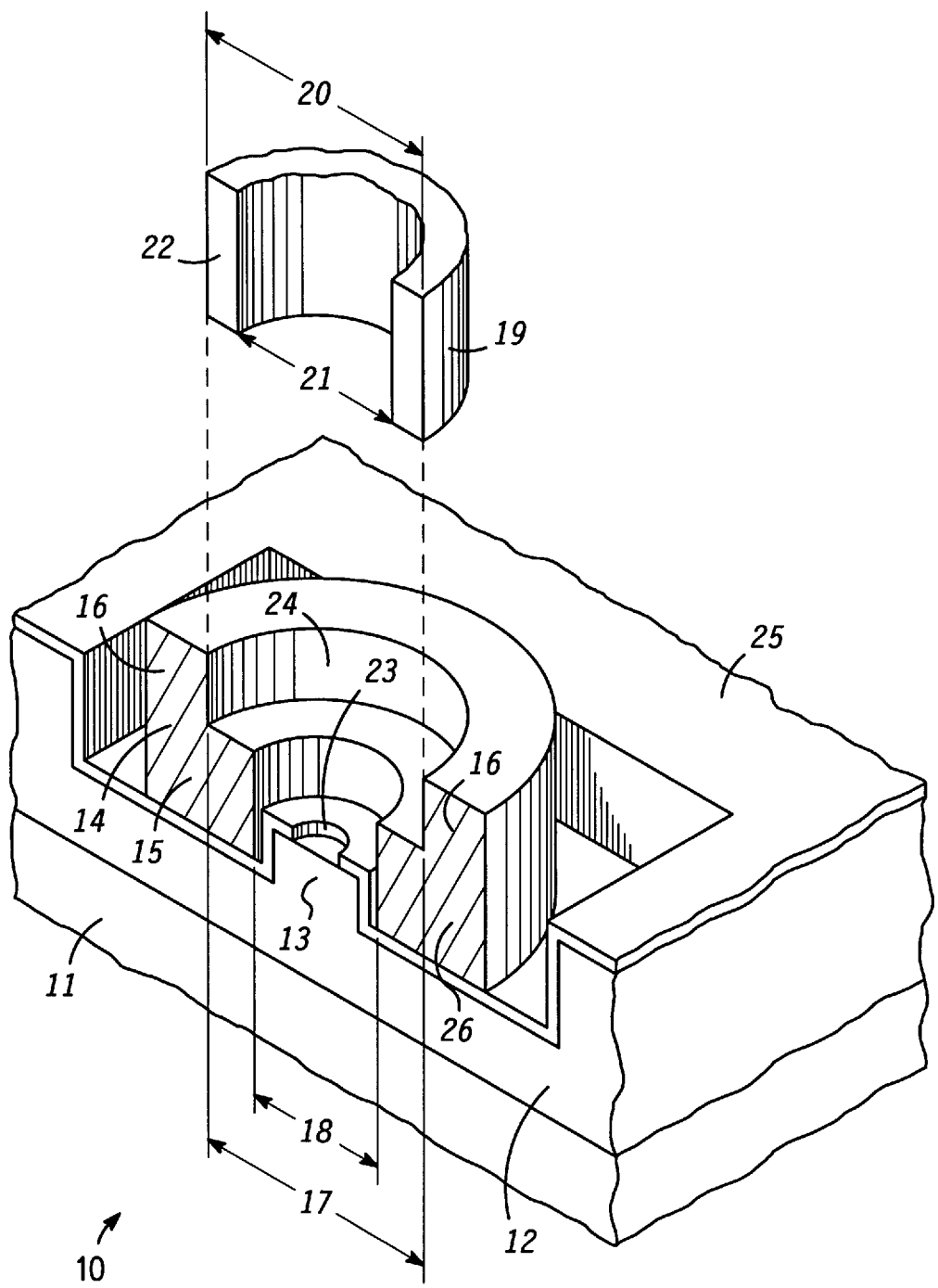
FIG. 1 illustrates a partial cross-sectional view of an electronic component for aligning an optical fiber in accordance with the present invention.

Turning to the figures for a more detailed description, FIG. 1 illustrates a partial cross-sectional view of an electronic component for aligning an optical fiber in accordance with the present invention. An electronic component 10 includes a semiconductor substrate 11 which contains or supports at least one semiconductor device 12. Semiconductor substrate 11 is comprised of semiconductor material including, but not limited to, silicon, gallium arsenide, silicon carbide, or indium phosphide. In particular, semiconductor device 12 is preferably an optical or light emitting device such as a vertical cavity surface emitting laser (VCSEL) as described in U.S. Pat. No. 5,351,257 which is hereby incorporated herein by reference. Semiconductor device or vertical cavity surface emitting laser 12 has a region or portion 13 which radiates light as an optical signal in a direction away from semiconductor substrate 11 and portion 13. Alternatively, semiconductor device 12 can be a light detecting device such as, for example, a photodiode.

After fabrication of the semiconductor device or light emitting device 12, a passivation layer 25 is provided or, preferably, deposited over semiconductor substrate 11 and semiconductor device 12. Passivation layer 25 comprises conventional passivation materials including, but not limited to, silicon nitride, silicon oxynitride, or polyimide. An opening 23 is etched into passivation layer 25 and is aligned over and exposes portion 13 of semiconductor device 12. The optical signal radiating from portion 13 of semiconductor device 12 is not trapped within semiconductor device 12 by passivation layer 25 due to opening 23 which permits the optical signal to radiate away from semiconductor substrate 11.

Next, an alignment feature 14 is fabricated over semiconductor device 12, semiconductor substrate 11, and passivation layer 25. In this embodiment of the present invention, alignment feature 14 has the shape of a collet in order to align an end 22 of an optical fiber or light transmitting structure 19 to portion 13 of semiconductor device 12. Alignment feature or collet 14 has an opening 24 exposing a portion of passivation layer 25 and aligned over or exposing opening 23 of passivation layer 25. Opening 24 is also aligned over or exposes portion 13 of semiconductor device 12. Opening 24 of collet 14 has a diameter 18 formed by a portion 15 and a diameter 17 formed by a portion 16 of collet 14. As portrayed in FIG. 1, diameter 17 is larger than diameter 18. Collet 14 is preferably a right angle circular cylinder but can be a variety of other shapes such as, for example, a tapered structure which is narrower near opening 23 of passivation layer 25 and is wider away from opening 23.

A plating technique can be used to manufacture collet 14 over passivation layer 25. In a preferred embodiment, collet 14 is fabricated using a plating technique as used in a flip chip bump process. In this preferred embodiment, no additional processing steps are required to provide the additional functionality of optical fiber alignment. A seed layer (not shown) can be sputtered over passivation layer 25, and a first patterned photoresist layer (not shown) can be disposed over the seed layer such that portion 15 is plated to a desired height while maintaining a diameter 18 of opening 24. Next, a second patterned photoresist layer (not shown) can be disposed over a region of portion 15, and the plating process is then continued to form portion 16 while maintaining diameter 17 of opening 24.

To improve the rigidity and structural integrity of collet 14, an additional layer (not shown) can be plated over portions 15 and 16. In this manner, portions 15 and 16 can be comprised of softer materials conventionally used in flip chip bump plating processes such as, for example, gold and copper. The additional layer preferably comprises rhodium, tungsten, iridium, or other materials which can provide a rigid protective layer over portions 15 and 16 of collet 14.

After formation of collet 14, end 22 of optical fiber 19 is positioned by or adjacent to collet 14 and inserted into opening 24 of collet 14. Opening 24 is preferably round to provide a more precise alignment of optical fiber 19 to semiconductor device 12. Optical fiber 19 can be mechanically glued into collet 14 to provide a permanent connection. Optical fiber 19 conducts light or the optical signal away from portion 13 of semiconductor device 12.

The preferred dimensions of diameters 17 and 18 depend upon the size of optical fiber 19. In particular optical fiber has diameters 20 and 21. The transmitted optical signal travels through diameter 21 while the difference between diameters 20 and 21 represents the thickness of the walls or cladding layer of optical fiber 19. Diameter 17 of collet 14 is greater than or equal to diameter 20 of optical fiber 19, and diameter 18 of collet 14 is less than or equal to diameter 21 of optical fiber 19. In this manner, when end 22 of optical fiber 19 is positioned or inserted into opening 24 of collet 14, end 22 is offset from portion 13 of semiconductor device 12 by the height of portion 15 of collet 14. The offset between end 22 and portion 13 is desired to maximize light transfer efficiency from semiconductor device 12 to optical fiber 19 and to prevent mechanical damage to semiconductor device 12.

The preferred height of portion 15 of collet 14 depends upon the size of opening 23 and the size of diameter 21 of optical fiber 19. For single mode light transmission, a scattering half angle of 8 degrees is preferably maintained between opening 23 and optical fiber 19. By way of example only, if diameter 21 of optical fiber 19 were approximately 125 microns and if opening 23 were approximately 10 microns wide, then the height of portion 15 of collet 14 can be approximately 10 microns.

A semiconductor device which generates light can produce significant amounts of heat which needs to be efficiently dispersed to improve the reliability of the semiconductor device. Although not shown in FIG. 1, collet 14 can cover a substantial portion of passivation layer 25 to help dissipate heat from semiconductor device 12. However, regardless of its size, collet 14 can serve both as an alignment feature and as a heat sink 26.

Therefore, as illustrated in FIG. 1, a low cost structure embodied as electronic component 10 is provided to accurately and easily align optical fiber 19 to semiconductor device 12. It is understood that semiconductor device 12 can contain a plurality of light emitting regions and a corresponding plurality of collets. Similarly, semiconductor substrate 11 can contain a plurality of semiconductor devices. A further variation of the present invention as embodied in FIG. 1 modifies collet 14 such that its shape is a rectangular trough which enables a plurality of optical fibers to be simultaneously coupled to semiconductor substrate 11.

Figure 2:
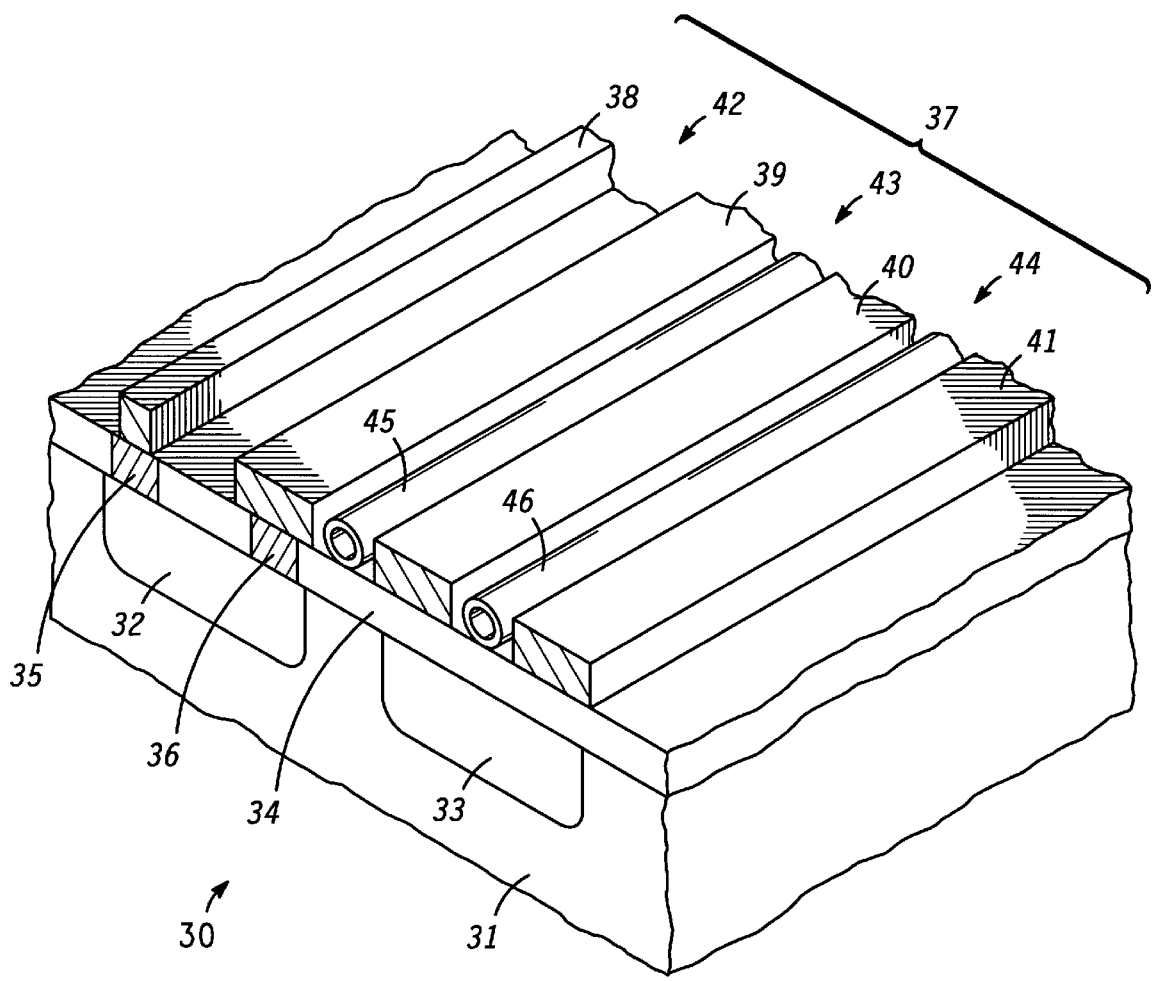
FIG. 2 represents a partial cross-sectional view of an alternative embodiment of an electronic component for aligning an optical fiber.

Continuing with FIG. 2, an alternative embodiment of the present invention is represented by a partial cross-sectional view of an electronic component for aligning an optical fiber in accordance with the present invention. An electronic component 30 includes a semiconductor substrate 31 which contains or supports semiconductor devices 32 and 33. Semiconductor substrate 31 is comprised of semiconductor material including, but not limited to, silicon, gallium arsenide, silicon carbide, or indium phosphide. It is understood that semiconductor substrate 31 can contain or support more than or less than the two semiconductor devices portrayed in FIG. 2. Semiconductor devices 32 and 33 in semiconductor substrate 31 are fabricated using conventional semiconductor manufacturing processes.

Interconnect structures 35 and 36 are electrically coupled to semiconductor device 32. Although interconnect structures 35 and 36 depict a single layer on interconnect, it is understood that interconnect structures 35 and 36 can represent a multilevel interconnect structure as well. Passivation layer 34 is located over semiconductor substrate 31 and semiconductor devices 32 and 33 and serves a similar purpose and can be of a similar composition as passivation layer 25 of FIG. 1.

Alignment feature 37 is provided over passivation layer 34, semiconductor substrate 31, and semiconductor devices 32 and 33 in FIG. 2 to align light transmitting structures or optical fibers 45 and 46. Alignment feature 37 comprises structures 38, 39, 40, and 41 which can be fabricated using a plating technique. In a preferred embodiment, alignment feature 37 is fabricated using a plating technique as used in a flip chip bump process. In this preferred embodiment, no additional processing steps are required to provide the additional functionality of optical fiber alignment.

To improve the rigidity and structural integrity of alignment feature 37, an additional layer (not shown) can optionally be plated over structures 38, 39, 40, and 41. Therefore, structures 38, 39, 40, and 41 can comprise softer materials including, but not limited to, gold and copper which are conventionally used in a flip chip bump process. If used, the additional layer preferably comprises rhodium, tungsten, iridium, or other materials which can provide a rigid protective layer over alignment feature 37.

Alignment feature 37 has an opening 42 located between two structures 38 and 39, has an opening 43 located between two structures 39 and 40, and has an opening 44 located between two structures 40 and 41. Openings 42, 43, and 44 expose a portion of passivation layer 34. Optical fiber 45 is positioned or located in opening 43 and is positioned by or adjacent to structures 39 and 40 while optical fiber 46 is positioned or located in opening 44 and is adjacent to structures 40 and 41. Although not portrayed in FIG. 2, an additional optical fiber can be placed in opening 42 of electronic component 30.

As illustrated in FIG. 2, structures 38, 39, 40, and 41 are substantially parallel to each other to provide precise alignment for optical fibers 45 and 46. Although substantially parallel, structures 38, 39, 40, and 41 do not have to be straight as shown in FIG. 2 but can be curved depending upon a desired configuration of alignment feature 37. The size of openings 42, 43, and 44 depends upon the size of the optical fibers to be aligned. Larger diameter optical fibers would require larger sized openings.

To provide adequate support for optical fibers 45 and 46, the preferred height of structures 38, 39, 40, and 41 is at least one third of the diameter of optical fibers 45 and 46. For similar reasons, the preferred width of structures 38, 39, 40, and 41 is at least one fifth of the diameter of optical fibers 45 and 46.

Optical fibers 45 and 46 can be mechanically glued into openings 43 and 44, respectively, to provide a permanent connection to electronic component 30. Alternatively, optical fibers 45 and 46 can be fixed within openings 43 and 44 by overplating structures 39, 40, and 41. In other words, after positioning optical fibers 45 and 46, an additional plating process can be used to affix optical fibers 45 and 46 to electronic component 30 and to enclose optical fibers 45 and 46 within openings 43 and 44, respectively.

Also depicted in FIG. 2, structure 38 is electrically coupled to interconnect structure 35 while structure 39 is electrically coupled to interconnect structure 36. In this manner, structures 38 and 39 can provide electrical contact to semiconductor device 32. Furthermore, since alignment feature 37 can be fabricated during a flip chip bump process, structure 38 can also be referred to as flip chip bump or electrical contact 38 and structure 39 as electrical contact 39. The overlying alignment feature can be narrower or wider than the underlying interconnect structure as portrayed by structures 38 and 39, respectively.

Similar to alignment feature 14 of FIG. 1, alignment feature 37 of FIG. 2 can be a heat sink. For alignment feature 37 to serve as a more efficient thermal dissipater, structures 38 and 41 can be laterally extended to opposite edges of substrate 31.

Therefore, as illustrated in FIG. 2, another variation of a low cost structure, embodied as electronic component 30, is provided to accurately and easily align optical fibers over active circuitry contained within the supporting substrate. In the prior art, a separate semiconductor substrate which does not contain any semiconductor circuitry is generally etched to produce grooves within the semiconductor substrate for aligning optical fibers. Consequently, the inefficient usage of space produces unnecessarily large final products. However, if space is not a concern, the present invention would enable the use of non-etchable or non-semiconductor materials for semiconductor substrate 31.

Figure 3:
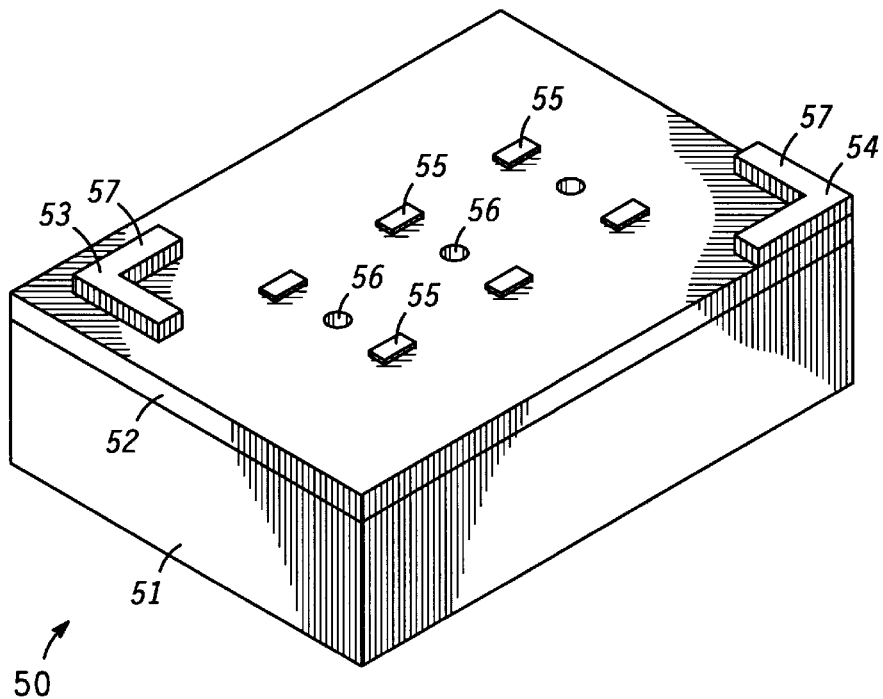
FIGS. 3 and 4 portray perspective views of yet another embodiment in accordance with the present invention.
Figure 4:
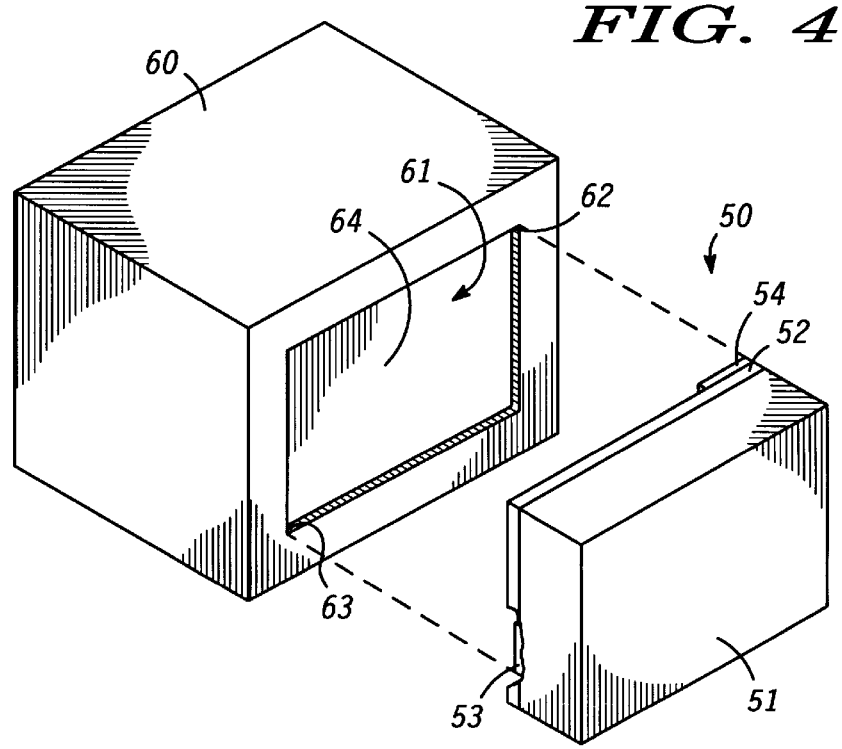

Referring now to FIGS. 3 and 4, yet another embodiment of the present invention is portrayed in perspective views of FIGS. 3 and 4. An electronic component 50 includes a semiconductor substrate 51 which has at least one semiconductor device fabricated using conventional processes. Semiconductor substrate 51 is similar in composition and functionality to semiconductor substrate 11 of FIG. 1. Moreover, semiconductor substrate 51 preferably contains VCSELs as described above for FIG. 1.

Passivation layer 52 of FIGS. 3 and 4 is located over semiconductor substrate 51 and serves a similar purpose and can be of a similar composition as passivation layer 25 of FIG. 1. Passivation layer 52 has openings 56 which expose the previously described light emitting portions of the underlying VCSELs in semiconductor substrate 51.

Flip chip bumps or electrical contacts 55 are electrically coupled to the semiconductor devices of semiconductor substrate 51. Simultaneously manufactured with flip chip bumps 55, alignment feature 57 comprises structures 53 and 54. Alignment feature 57 is located over semiconductor substrate 51 and passivation layer 52 and can be located over the semiconductor devices of semiconductor substrate 51. Alignment feature 57 can also be located at the edge of electronic component 50 as represented by structure 54 or can be located away from the edge of electronic component 50 as represented by structure 53. Similar to alignment features 14 and 37 of FIGS. 1 and 2, respectively, an additional protective layer (not shown) can be plated over structures 53 and 54.

In FIG. 4, a light transmitting structure 64 is partially encapsulated within a package 60 having an opening 61 to expose a portion of light transmitting structure 64. In the preferred embodiment, light transmitting structure 64 is a waveguide as described in U.S. Pat. No. 5,271,083 or as described in "A Low Cost, High Performance Optical Interconnect" as published in the 45th Electronic Components & Technology Conference (1995) and as written by Schwartz et al., both of which are hereby incorporated herein by reference. Opening 61 of package 60 is preferably molded into a desired mating configuration for alignment feature 57 of electronic component 50. In the preferred embodiment, corner 62 of opening 61 is mated with structure 54 of alignment feature 57, and corner 63 is mated with structure 53. Therefore, light transmitting structure 64 is positioned by or adjacent to alignment feature 57. The mating of opening 61 and alignment feature 57 accurately aligns openings 56 to waveguide 64 to maintain adequate light transfer efficiency from the light emitting device within electronic component 50 to waveguide 64.

The alignment accuracy of waveguide 64 and electronic component 50 is dependent upon the alignment accuracy of the photolithography process used in the plating process for manufacturing alignment feature 57. Using the low cost mating technique of FIG. 4, an alignment accuracy of less than four microns can be achieved. Moreover, this mating technique eliminates the necessity for expensive automation equipment or robots designed for precision alignment; cheaper or less precise robots can be used. Alignment feature 57 also provides an area of electronic component 50 onto which an adhesive can be applied for permanent mechanical mounting to waveguide 64 or package 60.

Therefore, as illustrated in FIGS. 3 and 4, yet another variation of an inexpensive structure, embodied as electronic component 50, is provided to both easily and precisely align a waveguide or light transmitting structure and a light emitting device. It is understood that other configurations of opening 61 and alignment feature 57 can be used within the scope and spirit of the subject invention. For instance, the corners or edges of structures 53 and 54 can be rounded to facilitate the insertion of structures 53 and 54 within opening 61. Additionally, the dimensions of alignment feature 57 can be enlarged to cover a larger portion of passivation layer 52 in order for alignment feature 57 to serve more efficiently as a heat dissipation structure.

In conclusion, in accordance with the present invention, it is apparent there has been provided many different embodiments of an electronic component which can align a light transmitting structure which overcomes the disadvantages of the prior art. The present invention provides an inexpensive solution for aligning optical fibers and waveguides which is easy to use, manufacturable, and is not time consuming.

We claim:

1. An electronic component for aligning a light transmitting structure, the electronic component comprising:
    a semiconductor substrate having a surface;
    a semiconductor device supported by the semiconductor substrate;
    a first alignment feature over the surface and the semiconductor device; and
    a second alignment feature over the surface and the semiconductor device and substantially parallel to the first alignment feature, the light transmitting structure over the surface and aligned by and substantially parallel to the first and second alignment features wherein the light transmitting structure is capable of transmitting light in a direction substantially parallel to the surface.

2. The electronic component according to claim 1, wherein the light transmitting structure is located between the first and second alignment features and further comprising an electrically conductive layer over the first and second alignment features wherein the electrically conductive layer is located between the light transmitting structure and the first and second alignment features.

3. The electronic component according to claim 2, wherein the first and second alignment features are electrically coupled to the semiconductor device.

4. The electronic component according to claim 1, wherein the semiconductor device is an optical device.

5. The electronic component according to claim 4, wherein the first alignment feature is an electrode for the semiconductor device.

6. The electronic component according to claim 1 wherein all surfaces of the second alignment feature are substantially parallel to surfaces of the first alignment feature.

7. An electronic component for aligning an optical fiber having an end, the electronic component comprising:
    a semiconductor substrate;
    a light emitting device supported by the semiconductor substrate, the light emitting device radiating light from a portion of the light emitting device; and
    a metal alignment feature over the light emitting device, the metal alignment feature having an opening aligned to the portion of the light emitting device wherein the opening has at least two different diameters and wherein the metal alignment feature is devoid of electrical contact with the light emitting device,
    the end of the optical fiber positioned in the opening of the metal alignment feature to permit transmission of the light from the portion of the light emitting device wherein the optical fiber is offset from the semiconductor substrate.

8. The electronic component according to claim 7, wherein the light emitting device is a vertical cavity surface emitting laser.

9. The electronic component according to claim 7, wherein the metal alignment feature is a heat sink.

10. The electronic component according to claim 7, wherein the metal alignment feature provides the offset between the end of the optical fiber and the semiconductor substrate and wherein the optical fiber contacts sidewalls of only one of the at least two different diameters of the opening in the metal alignment feature.

11. The electronic component according to claim 7, further comprising:
    a first diameter and a second diameter for the optical fiber, the first diameter greater than the second diameter, wherein a first one of the at least two diameters of the metal alignment feature is greater than or equal to the first diameter of the optical fiber and wherein the second diameter of the optical fiber is greater than or equal to a second one of the at least two diameters of the metal alignment feature, and
    wherein the optical fiber is absent from a portion of the opening having the second one of the at least two diameters.

12. The electronic component according to claim 7 further comprising a protective layer overlying the metal alignment feature.

13. The electronic component according to claim 7 wherein the metal alignment feature is a collet.

* * * * *